United States Patent
Komatsu

(10) Patent No.: US 7,815,800 B2
(45) Date of Patent: Oct. 19, 2010

(54) REFUSE/OIL REMOVING DEVICE AND REFUSE/OIL RECOVERY BAG

(76) Inventor: Kiyoshi Komatsu, 41-18, Kanamachi 3-chome, Katsushika-ku, Tokyo (JP) 125-0042

( * ) Notice: Subject to any disclaimer, the term of this patent is extended or adjusted under 35 U.S.C. 154(b) by 1190 days.

(21) Appl. No.: 10/579,728

(22) PCT Filed: Nov. 19, 2004

(86) PCT No.: PCT/JP2004/017238

§ 371 (c)(1),
(2), (4) Date: May 17, 2006

(87) PCT Pub. No.: WO2005/049929

PCT Pub. Date: Jun. 2, 2005

(65) Prior Publication Data

US 2007/0095749 A1 May 3, 2007

(30) Foreign Application Priority Data

Nov. 20, 2003 (JP) .............................. 2003-390412
May 21, 2004 (JP) .............................. 2004-151659
Nov. 12, 2004 (JP) .............................. 2004-329083

(51) Int. Cl.
*B01D 36/04* (2006.01)
*B01D 29/27* (2006.01)

(52) U.S. Cl. ................. 210/232; 210/307; 210/461; 210/462; 210/470; 210/489; 210/538

(58) Field of Classification Search ............... 210/162, 210/170.03, 232, 299, 305, 307, 461, 462, 210/470, 489, 532.1, 538, 540
See application file for complete search history.

(56) References Cited

U.S. PATENT DOCUMENTS 3,282,430 A * 11/1966 Kinne ........................ 210/162

(Continued)

FOREIGN PATENT DOCUMENTS

JP  50-49553  5/1975

(Continued)

OTHER PUBLICATIONS

Japanese Office Action dispatched May 12, 2009 in counterpart Japanese application (with partial translation).

(Continued)

*Primary Examiner*—Christopher Upton
(74) *Attorney, Agent, or Firm*—Wenderoth, Lind & Ponack L.L.P.

(57) ABSTRACT

A refuse/oil removing device and a refuse/oil recovery bag are provided which can remove refuse and oil contained in drainage discharged from a restaurant in a simple manner without contact with the refuse and oil. A support base of a support unit is disposed in the interior of a grease trap at a position higher than the water level. A recovery bag is attached to the support unit and plural layers of bag portions of the recovery bag are put on the support base. The bag portions are each formed of a material which permits the adhesion of oil thereto and a large number of water passing holes are formed in each of the bag portions. Drainage is introduced inside the innermost one of the plural layers of bag portions and is passed through the bag portions, allowing refuse and oil to adhere to the bag portions. In this way, the job of replacing the recovery bag can be simplified and the amount of oil accumulated within the grease trap can be decreased.

18 Claims, 10 Drawing Sheets

U.S. PATENT DOCUMENTS

| | | | | |
|---|---|---|---|---|
| 4,268,396 | A * | 5/1981 | Lowe | 210/532.1 |
| 5,405,539 | A * | 4/1995 | Schneider | 210/170.03 |
| 6,358,405 | B1 * | 3/2002 | Leahy | 210/162 |
| 6,749,746 | B2 * | 6/2004 | Mokrzycki | 210/170.03 |
| 6,797,161 | B2 * | 9/2004 | Use et al. | 210/305 |
| 6,800,195 | B1 * | 10/2004 | Batten et al. | 210/540 |
| 6,875,345 | B2 * | 4/2005 | Hannah | 210/162 |
| 2002/0185422 | A1 * | 12/2002 | Turner et al. | 210/162 |
| 2006/0163130 | A1 * | 7/2006 | Happel et al. | 210/299 |

FOREIGN PATENT DOCUMENTS

| | | |
|---|---|---|
| JP | 52-55656 | 4/1977 |
| JP | 61-15202 | 1/1986 |
| JP | 63-300001 | 12/1988 |
| JP | 4-53876 | 5/1992 |
| JP | 08-041970 | 2/1996 |
| JP | 08-224409 | 9/1996 |
| JP | 9-165103 | 6/1997 |
| JP | 10-225680 | 8/1998 |
| JP | 10-266325 | 10/1998 |
| JP | 11-147008 | 6/1999 |
| JP | 11-158987 | 6/1999 |
| JP | 3063807 | 9/1999 |
| JP | 2002-161577 | 6/2002 |
| JP | 2003-001282 | 1/2003 |
| JP | 2003-024930 | 1/2003 |
| JP | 2003-126851 | 5/2003 |
| JP | 2004-105939 | 4/2004 |
| JP | 2004-188405 | 7/2004 |

OTHER PUBLICATIONS

Japanese Office Action issued Jul. 15, 2008 in Japanese application that is a counterpart to the present U.S. application (with partial English translation).

* cited by examiner

REFUSE/OIL REMOVING DEVICE AND REFUSE/OIL RECOVERY BAG

BACKGROUND OF THE INVENTION

I. Technical Field

The present invention relates to a refuse/oil removing device for removing refuse and oil contained in drainage from restaurants, as well as a recovery bag for the recovery of such refuse and oil.

II. Description of Related Art

A large amount of refuse having shapes (e.g., food residues, toothpicks and skewers) and oil (sludge such as oil and fat) are mixed in drainage discharged from kitchens for business use such as those in restaurants wherein cooking and washing of tableware are performed frequently. When such refuse and oil flow through a sewer pipe, they adhere to the inner surface of the pipe and coagulate, with a likely consequence that the pipe diameter may be reduced or the pipe may be blocked. There also has been the problem that the environment, including rivers, is badly influenced by outflow of such refuse and oil into a public sewerage.

For preventing the occurrence of the above problem, in restaurants and the like, a grease trap Japanese Patent Laid-Open No. 2002-161577 (pp. 2-3, FIG. 1) for separation of oil and water contained in the drainage is installed on an upstream side of a drain route leading to public sewerage, and refuse and oil are removed from water in the grease trap to prevent the entry of refuse and oil into the public sewerage.

A conventional, known grease trap will now be described with reference to FIG. 10. The grease trap, indicated at 10, is provided in the interior of a body 12 with an internal space for storing drainage discharged from a washing sink in a kitchen of a restaurant. In the interior space, a first tank 16, a second tank 18 and a third tank 20 which are partitioned from one another by means of slidable partition plates 14a and 14b are formed. Drainage from the kitchen washing sink (not shown) is introduced into the first tank 16 through an upstream-side drain passage 22 such as a gutter or a pipe. The first tank 16 and the second tank 18 communicate with each other below the partition plate 14a. Likewise, the second tank 18 and the third tank 20 communicate with each other below the partition plate 14b. An upwardly extending partition plate 24 is provided on the bottom within the second tank 18. With the partition plate 24, drainage introduced from the first tank 16 into the second tank 18 is sure to move once through the upper portion of the second tank 18. As the body 12, which forms the internal space, a wall-like body made of concrete is shown in FIG. 10, but a vessel-like body made of metal or FRP may be adopted.

Refuse having shapes (e.g., food residues, toothpicks and skewers) and oil are contained in the drainage discharged from a washing sink in a restaurant kitchen. A residue basket 26 formed for example by a metallic punch board having a large number of holes about 5 mm in diameter is provided within the first tank 16 so that drainage from an upstream drain passage 22 is introduced into the residue basket 26. The residue basket 26 is for trapping refuse having shapes such as food residues, toothpicks and skewers. Oil not having shape is discharged together with water into the first tank 16 through the holes of the residue basket 26. Since oil adheres to the refuse trapped within the refuse basket 26, a slight amount of oil is trapped within the refuse basket 26. However, most of the oil contained in drainage is discharged through the holes of the residue basket 26 into the first tank 16.

The drainage discharged through the residue basket 26 into the first tank 16 passes below the partition plate 14a and reaches the interior of the second tank 18. The drainage having thus reached the second tank 18 is once moved upward by the partition plate 24. Water and oil are separated from each other in the second tank 18 and the oil stagnates in the upper portion of the second tank 18, while the water stagnates in the lower portion of the same tank. The water thus stagnating in the tank lower portion passes below the partition plate 14b and reaches the third tank 20. A downstream discharge pipe 30 having an opening positioned sufficiently lower than the water level is provided within the third tank 20. The water having reached the third tank 20 is conducted to public sewerage (not shown) through the downstream discharge pipe 30.

Lids 32 with a handle are provided above the first, second and third tanks 16, 18, 20 for taking out the residue basket 26 from the first tank 16 or for washing the partition plates 14a, 14b and those tanks. In the case where the upstream drain passage 22 is a gutter, a lid 34 is provided above the gutter.

In the grease trap 10, refuse having shapes and contained in drainage is trapped by the residue basket 26 provided in the first tank 16. In the second tank 18, oil and water are separated from each other and the oil is allowed to rise and stay in the upper portion of the tank, then the oil thus accumulated in the second tank 18 is removed. In the third tank 20, the water after removal of refuse and oil is stored and is then discharged to a public sewerage or the like through the downstream discharge pipe 30. If the water level in the grease trap 10 with the drainage not flowing into the grease trap 10 is assumed to be a water level 36a, the opening of the downstream discharge pipe 30 is positioned sufficiently lower than the water level 36a. When drainage flows into the grease trap 10 and the water level in the third tank 20 becomes the water level 36b, the water present in the third tank 20 passes through the downstream discharge pipe 30 and is discharged to the public sewerage or the like.

SUMMARY OF THE INVENTION

The upper portion of the residue basket 26 installed within the first tank 16 is positioned above the water levels 36a and 36b, but most of the first tank 16 is immersed below the water levels 36a and 36b. The residue basket 26 traps refuse having shapes such as food residues, toothpicks and skewers, but oil adheres to the surface of the refuse having shapes and that of the residue basket 26. If food residue is kept immersed in water and a long time elapses, they oxidize and rot, emitting an offensive smell.

For the purpose of removing refuse containing food residue and trapped by the residue basket 26, before generation of an offensive smell, many restaurants make it a rule to perform every day both a refuse removing work for removing refuse from the residue basket 26 and a washing work for washing the same bag. The refuse removing work and the basket washing work of the residue basket 26 are jobs of restaurant workers. As other works jobs, there is the work of removing oil accumulated in the second tank 18 every week, for example, and the work of cleaning the inner wall surface of the body 12 (first, second and third tanks 16, 18, 20) of the grease trap 10 every month for example. However, these jobs are generally entrusted to dedicated cleaning companies.

In such restaurants as fast food restaurants there are many part-time workers, and many full-time and part-time workers dislike participating in the work of removing food residues which emit an offensive smell and the work of cleaning the residue basket 26 with oil adhered thereto thickly. If the full-time and part-time workers are compelled to participate in such jobs, many of them leave the restaurants on the ground that they dislike those jobs. Therefore, an inconvenience has so far occurred, such that both full-time and part-time workers must be invited hired constantly. If the workers fail to perform the food residue removing work and the cleaning work for the residue basket 26, rot proceeds and the rotten smell becomes more offensive. To avoid this, busy managers are compelled to do those jobs, that is, the burden on the managers increases.

The present invention has been accomplished in view of the above-mentioned problems and provides a refuse/oil removing device able to remove refuse and oil contained in drainage from restaurants without contact with the refuse and oil and that in a simple manner, as well as a recovery bag for the recovery of such refuse and oil.

A refuse/oil removing device according to the present invention is for use in a grease trap into which drainage discharged from a restaurant is introduced through a drain passage, the refuse/oil removing device comprising a recovery bag for introducing the drainage from the drain passage into the interior thereof, the recovery bag having plural layers of bag portions formed of a material which permits the adhesion of oil thereto; a multitude of water passing holes formed in each of the plural layers of bag portions; and support means for supporting the bag portions at a position higher than the level of water accumulated in the grease trap.

In the refuse/oil removing device according to the present invention, the recovery bag comprises a base portion formed of a material having rigidity and the plural layers of bag portions, a drainage introducing hole communicating with the interior of the plural layers of bag portions is formed in the base portion, and an outlet to the grease trap side in the drain passage is formed by a pipe, the pipe being inserted into the drainage introducing hole. In the refuse/oil removing device according to the present invention, the support means is provided with engaging means for engagement with the base portion of the recovery bag. In the refuse/oil removing device according to the present invention, the support means comprises leg portions, a support base for supporting the recovery bag, and a movable member displaceable relative to the leg portions and having engaging means for engagement with the base portion of the recovery bag, the recovery bag is spaced away from the pipe at one movement end of the movable member, while at an opposite movement end of the movable member a front end of the pipe is positioned inside the bag portions of the recovery bag. In the refuse/oil removing device according to the present invention, a grasping hole is formed in the base portion. In the refuse/oil removing device according to the present invention, the plural layers of bag portions are each formed by a net. In the refuse/oil removing device according to the present invention, the material of the net is synthetic resin or synthetic fiber. In the refuse/oil removing device according to the present invention, the material of the plural layers of bag portions is non-woven fabric. In the refuse/oil removing device according to the present invention, the size of each of the water passing holes is 1 to 5 mm.

A refuse/oil recovery bag according to the present invention is for the recovery of refuse and oil contained in drainage discharged from a restaurant, refuse/oil recovery bag comprising a base portion having rigidity and formed with a drainage introducing hole and plural layers of bag portions fixed to the base portion in a state in which the hole of the base portion is covered along its circumference with an opening of the bag portions, the plural layers of bag portions being formed of a material which permits the adhesion of oil thereto, and a multitude of water passing holes being formed in the plural layers of bag portions.

In the refuse/oil recovery bag according to the present invention, a grasping hole is formed in the base portion. In the refuse/oil recovery bag according to the present invention, the plural layers of bag portions are each formed by a net. In the refuse/oil recovery bag according to the present invention, the material of the net is synthetic resin or synthetic fiber. In the refuse/oil recovery bag according to the present invention, the material of the plural layers of bag portions is non-woven fabric. In the refuse/oil recovery bag according to the present invention, the size of each of the water passing holes is 1 to 5 mm.

According to the present invention, by merely taking out the recovery bag from the support means, it is possible to remove refuse and a large amount of oil which, without the recovery bag, would be discharged into the grease trap. The work required is as simple as merely replacing the recovery bag. The work of removing refuse from residue and the work of cleaning a residue basket, which have so far been required, can be omitted. As a result, unpleasant works associated with the grease trap are no longer needed and hence it is possible to improve the rate of settling down of full-time and part-time workers in restaurants. Moreover, the bag portions of the recovery bag are always positioned above the water level in the grease trap and therefore, if the recovery bag is removed when there is no water within the bag portions, there no longer is any drop of water from the recovery bag nor is the hand stained with drainage. In the present invention, the movable member for attaching and detaching the recovery bag in the support means is movable relative to the leg portions and other portions, and by moving only the movable member without moving the whole of the support member, the recovery bag can be attached to and detached from the drain pipe and thus the recovery bag attaching and detaching work becomes very easy.

In the present invention, the bag portions of the recovery bag are formed as plural layers and are formed of a material which permits the adhesion of oil thereto. Thus, refuse and oil can be trapped by the plural layers of bag portions and most of oil discharged from discharge means toward the grease trap, as well as refuse adhered to the oil, can be trapped. As a result, not only the amount of oil accumulated in the second tank of the grease trap can be greatly diminished and the interval of the work for removing oil from the second tank can be greatly prolonged, but also the interval of cleaning within the grease trap can be prolonged and the cost of the cleaning work can be greatly decreased.

DETAILED DESCRIPTION OF THE INVENTION

The present invention will be described hereinunder with reference to the drawings.

Figure 1:
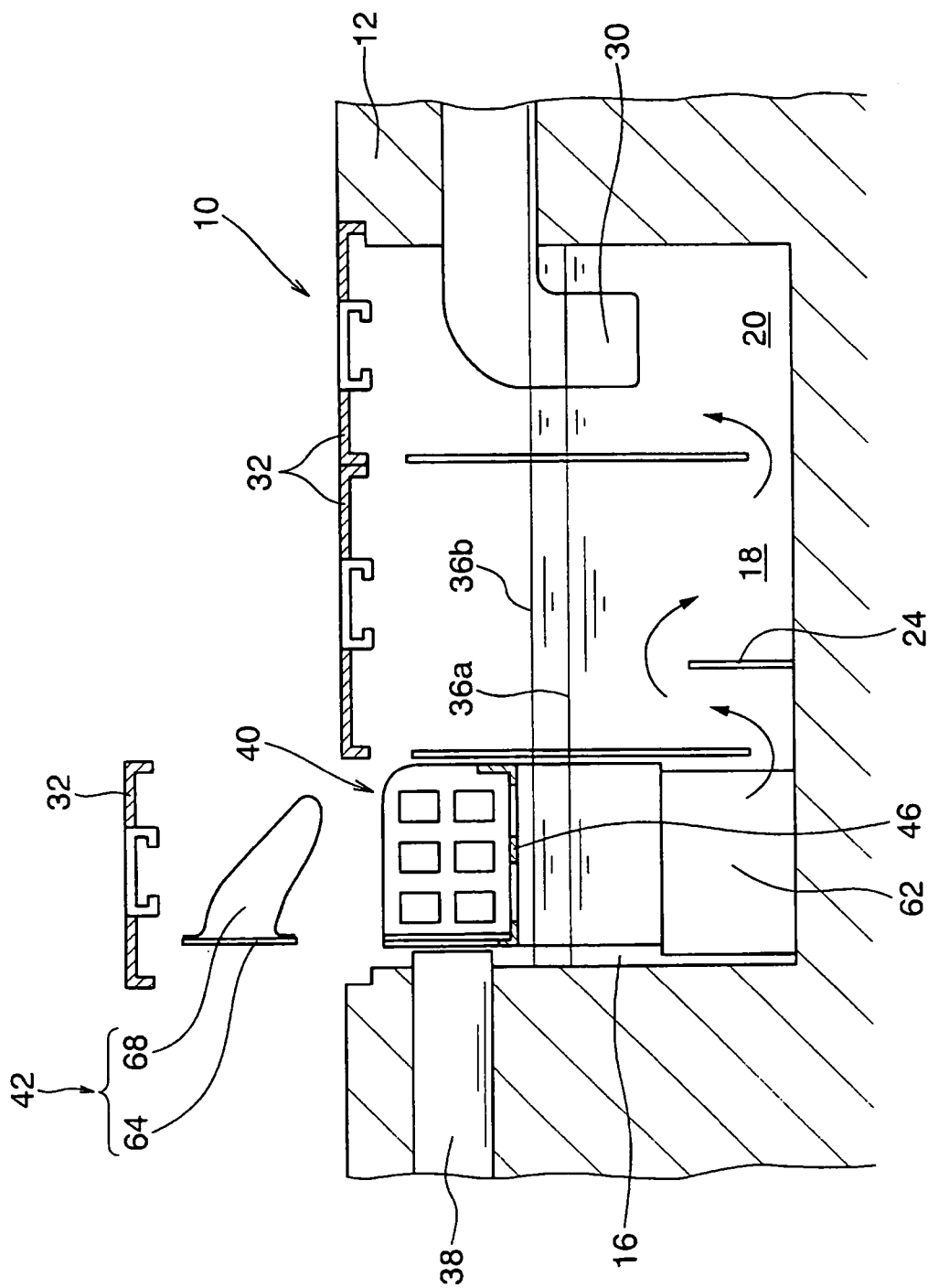
FIG. 1 is a sectional view showing a state in which a refuse/oil removing device according to the present invention is provided within a grease trap.
Figure 2:
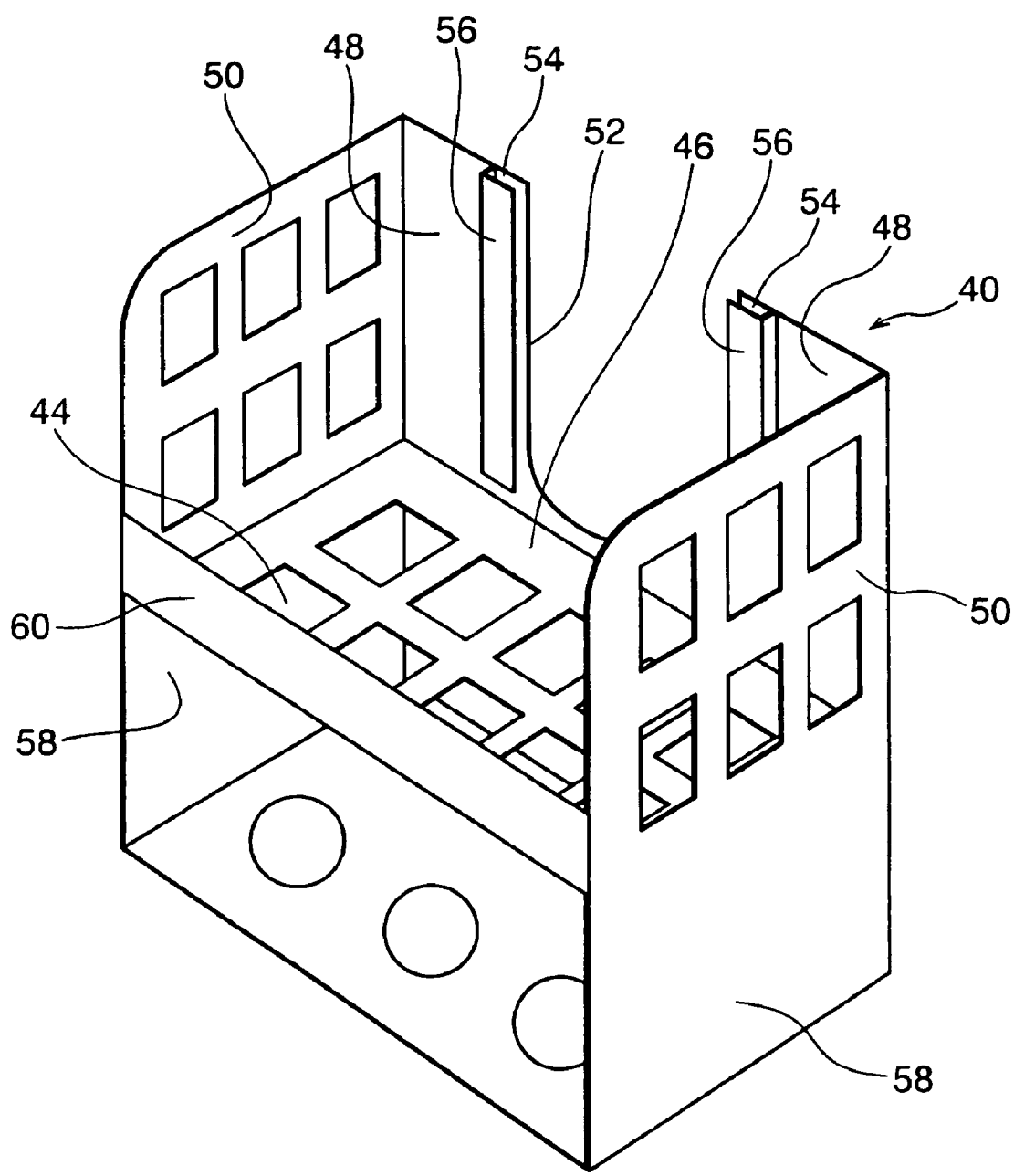
FIG. 2 is a perspective view showing an example of support means used in the present invention.
Figure 3:
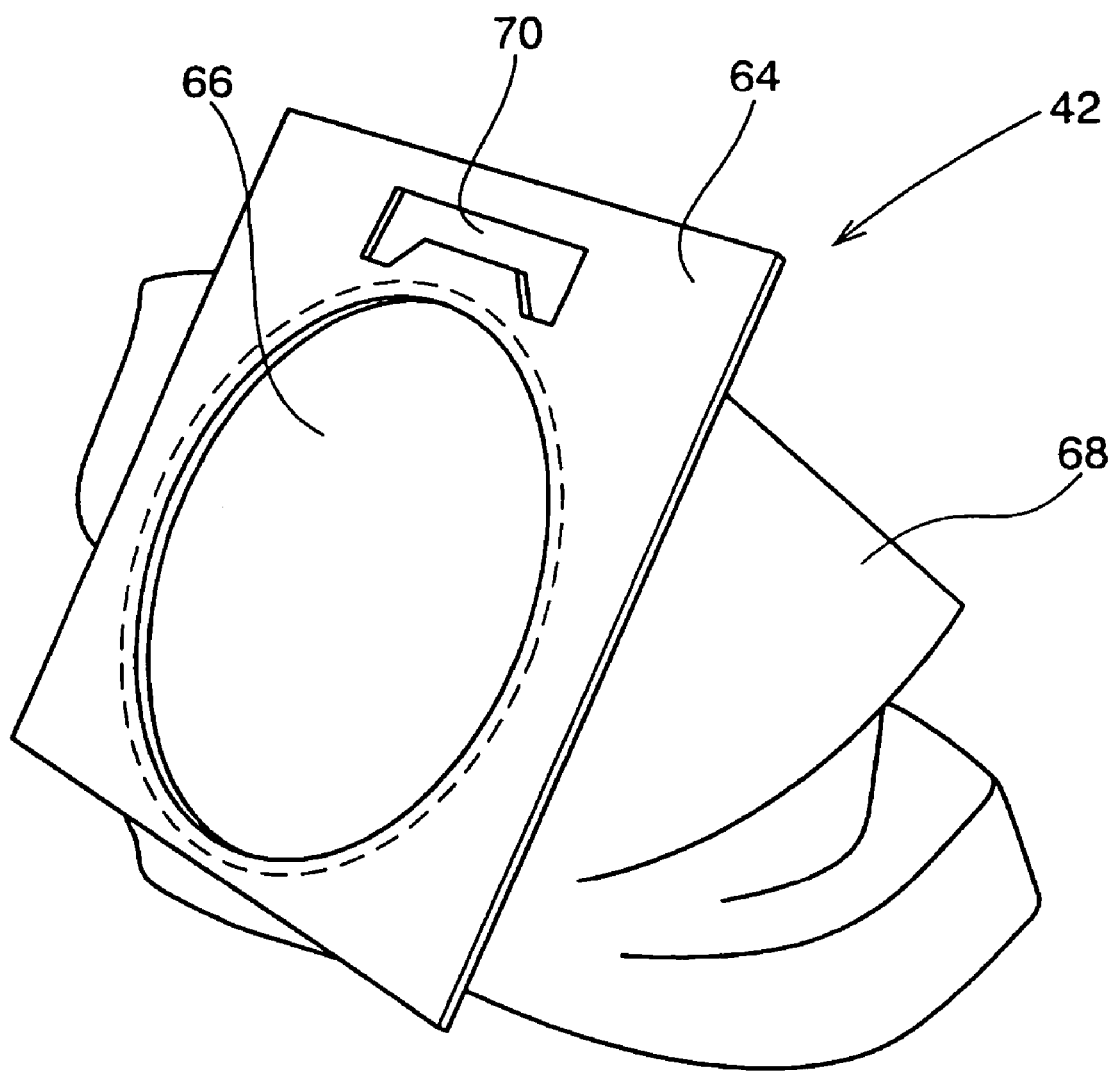
FIG. 3 is a perspective view showing an example of a recovery bag used in the present invention.
Figure 10:
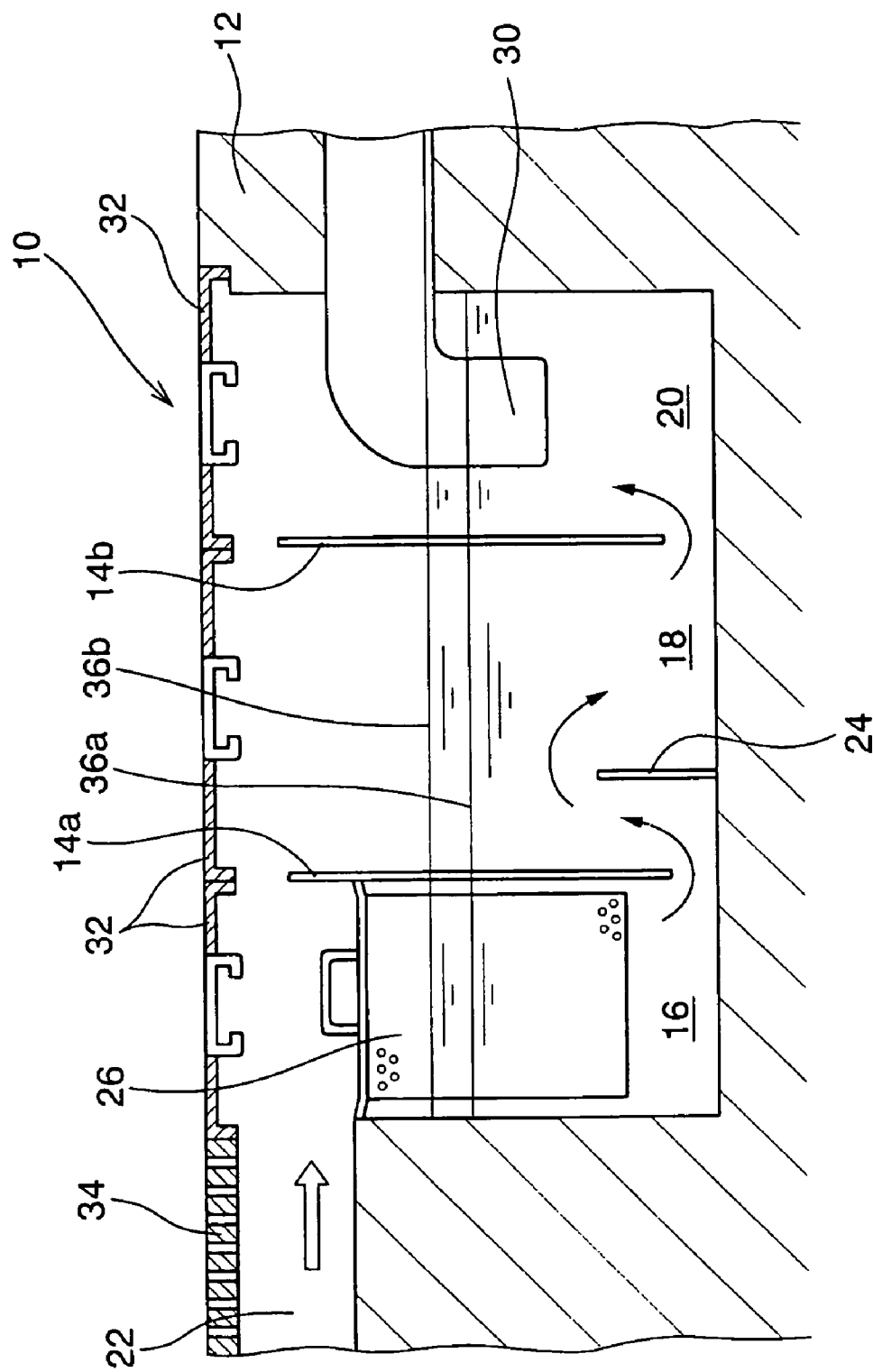
FIG. 10 is a sectional view showing an example of a conventional grease trap.

FIG. 1 is a sectional view showing a state in which a refuse/oil removing device according to the present invention is provided within a grease trap, FIG. 2 is a perspective view showing an example of a support means used in the present invention, and FIG. 3 is a perspective view showing an example of a recovery bag used in the present invention. In FIG. 1, the same reference numerals as in FIG. 10 represent the same members as in FIG. 10. In the present invention there is used a conventional, known grease trap 10, provided it is preferable that an outlet side of an upstream drain passage for introducing drainage into a first tank 16 be not a gutter but a drain pipe 38. In the refuse/oil removing device according to the present invention, support means 40 shown in FIG. 2 and a recovery bag 42 shown in FIG. 3 are used instead of the residue basket 26 shown in FIG. 10.

The support means 40 shown in FIG. 2 is for putting thereon of a bag portion 68 of the recovery bag 42 shown in FIG. 3 and has a support base 46 formed with plural water passing holes 44. The height of the support base 46 is set to a height such that the support base does not sink under water even when a maximum quantity of water is accumulated within the grease trap 10. The support means 40 is further provided with a front wall 48 positioned higher than the support base 46 and side walls 50 positioned on both sides of the front wall 48. A hole or cutout portion 52 is formed centrally of the front wall 48. In the front wall 48 there are formed fitting slots 54 vertically on both sides of the cutout portion 52. The fitting slots 54 are formed by first engaging means which are the front wall 48 and L-shaped engaging members 56 fixed inside the front wall. The portions of the side walls 50 positioned lower than the support base 46 serve as legs 58 which are integral with the side walls 50. An anti-falling guide 60 for the prevention of falling of the recovery bag 42 is erected on an end of the support base 46 on the side opposite to the front wall 48. As shown in FIG. 1, a pedestal 62 is disposed on the bottom of the first tank 16 and the legs 58 of the support means 40 are put on the pedestal 62. The pedestal 62 may be omitted, while the legs 58 of the support means 40 may be made longer so that their lower ends are put in contact with the bottom of the first tank 16.

The recovery bag 42 shown in FIG. 3 is made up of a plate-like base portion 64 as second engaging means formed of a rigid material, a drainage introducing hole 66 formed in the base portion 64, and a bag portion 68 which is fixed to the base portion 64 in such a manner that an opening thereof surrounds the drainage introducing hole 66. The bag portion 68 is made up of, say, three layers of bag portions 68a, 68b, and 68c having openings located at the same position. It is preferable that the base portion 64 as second engaging means be formed of, for example, plate-like rigid paper or resin. By inserting the base portion 64 as second engaging means vertically into the slots 54 as first engaging means, the base portion 64 (recovery bag 42) can be attached to the support means 40 without disengagement. The first engaging means is not limited to the slots 54 insofar as the base portion 64 of the recovery bag 42 can be attached to the support means 40 detachably. Likewise, the second engaging means is not limited to a plate-like one adapted to fit in the slots 54. The drainage introducing hole 66 formed in the base portion 64 is for introducing drainage discharged from a washing sink of a kitchen into the bag portion (the innermost bag portion 68a out of the three layers of bag portions 68a, 68b, and 68c). In addition to the drainage introducing hole 66, a grasping hole 70 which permits insertion therein of a hand is formed in the base portion 64.

Figure 4:
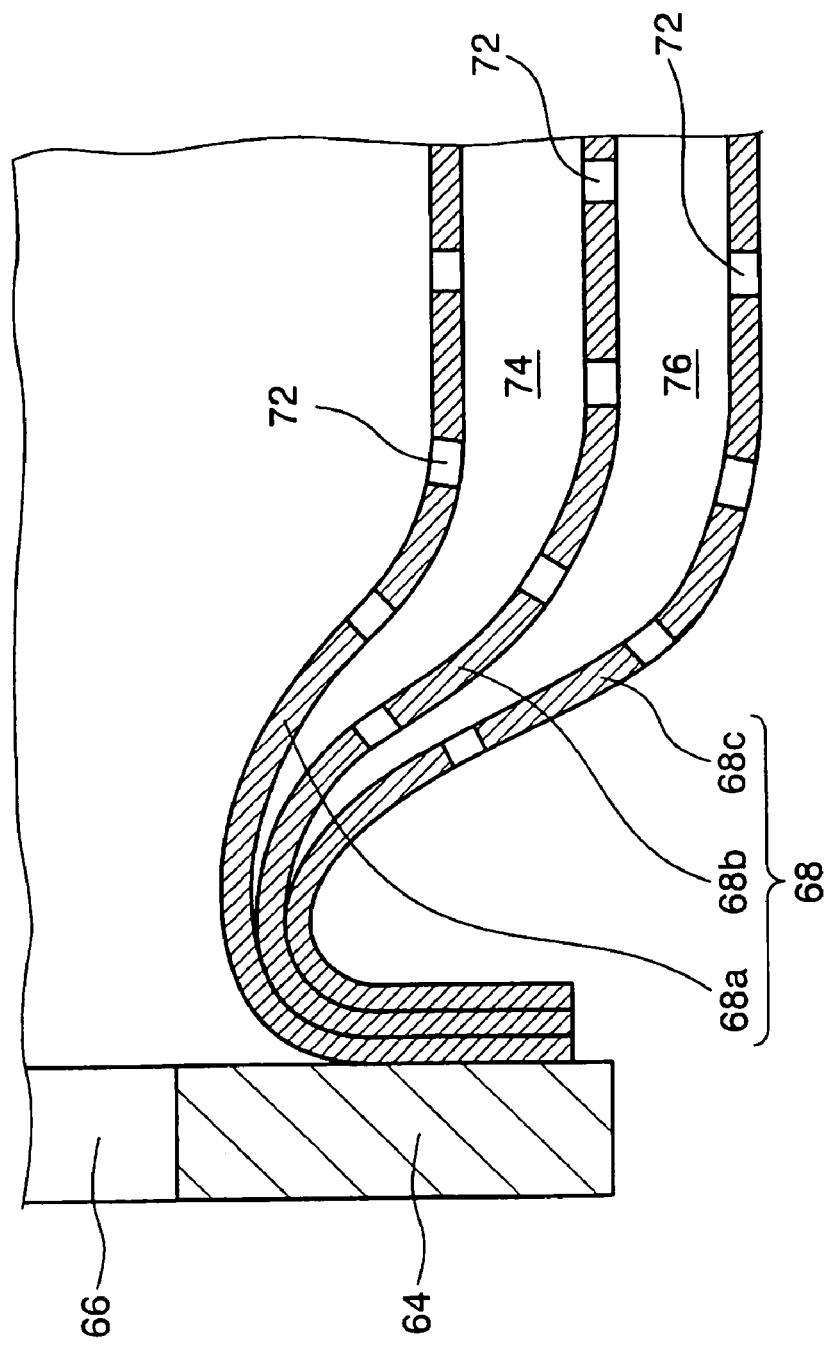
FIG. 4 is a sectional view of a principal portion of the recovery bag shown in FIG. 3.

The bag portions 68a, 68b, and 68c are formed using a material which permits the adhesion of oil thereto, e.g., non-woven fabric. The non-woven fabric permits water to pass therethrough but does not permit the passage of oil therethrough. The three layers of bag portions 68 includes the bag portion 68a which surrounds at its opening the drainage introducing hole 66 formed in the base portion 64. The outside of the bag portion 68a is covered with the bag portion 68b and the outside of the bag portion 68b is covered with the bag portion 68c. As shown in FIG. 4, a large number of water passing holes 72 which permits water to pass therethrough are formed in the bag portions 68a, 68b, and 68c. It is preferable for the water passing holes 72 to be, say, 1 mm to 5 mm (both inclusive) in diameter, provided no limitation is made thereto. If the diameter of each water passing hole 72 is smaller than 1 mm, there is a fear that water flow may become difficult, and if the diameter is larger than 5 mm, there is a fear that refuse may pass through the hole and become incapable of being captured. In the bag portions 68a, 68b, and 68c, for example, band-like non-woven fabric may be subjected to weaving so that many net-like spaces are formed in the resulting weave, and the many spaces may be used as the water passing holes 72.

As shown in FIG. 4, a first space 74 is formed between the bag portions 68a and 68b and a second space 76 is formed between the bag portions 68b and 68c. In FIG. 4, although the bag portion 68 is made up of three layers of bag portions 68a, 68b, and 68c successively from the inside toward the outside, no limitation is made thereto insofar as the bag portion 68 is made up of plural layers of two or more. However, with two layers of bag portions 68, the amount of oil trapped is small, while with four or more layers of bag portions 68, the weight increases and a greater force is needed for attaching and detaching the bag portions. Therefore, it is preferable that the bag portion 68 be made up of three layers.

Figure 5:
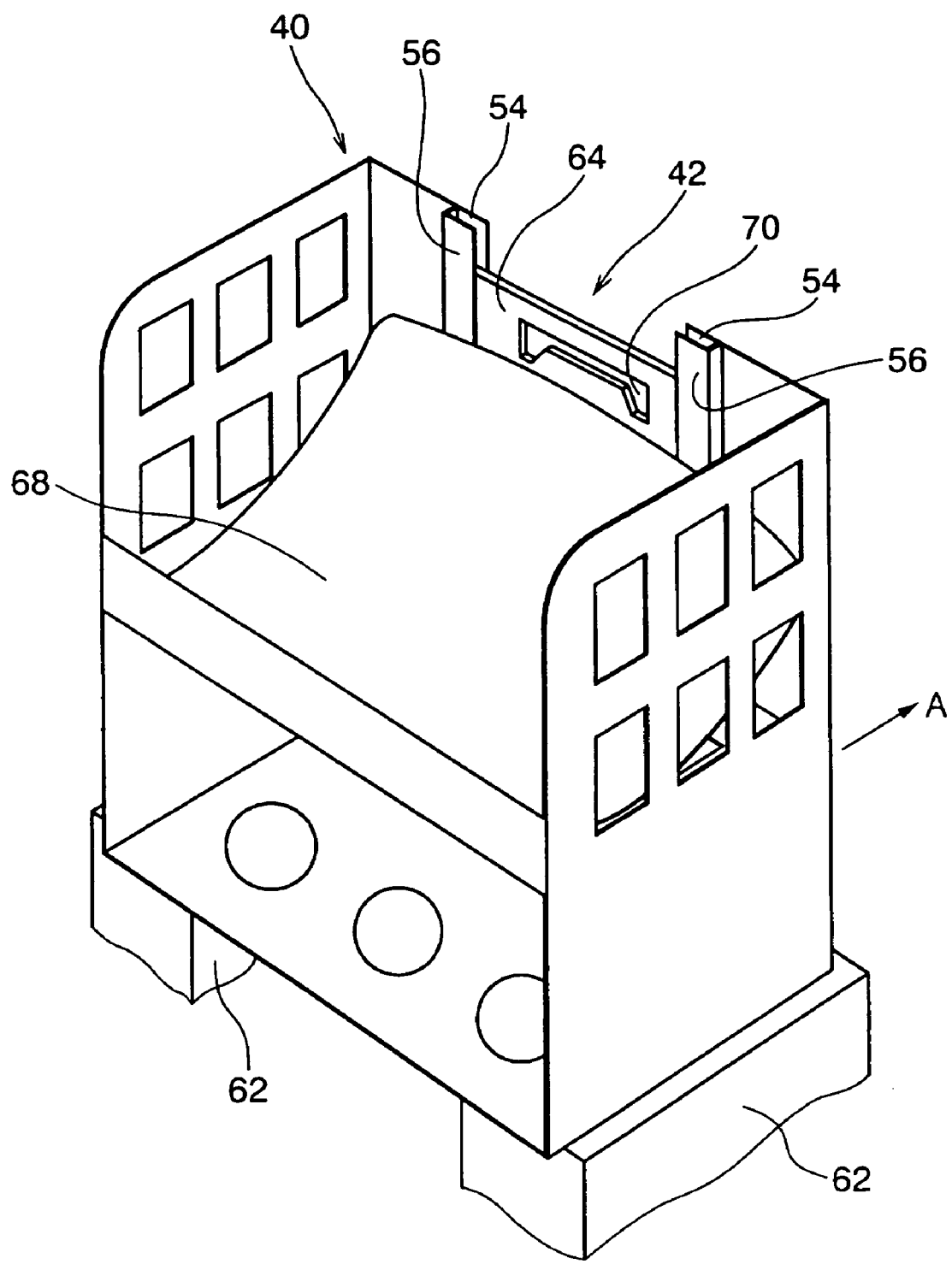
FIG. 5 is a perspective view showing a state in which the recovery bag of FIG. 3 is attached to the support means shown in FIG. 2.

FIG. 1 shows a state in which the support means 40 is accommodated within the first tank 16, but the recovery bag 42 has not been attached yet to the support means 40. In the state of FIG. 1, the base portion 64 of the recovery bag 42 is inserted from above into engagement with the slots 54 of the support means 40, whereby the recovery bag 42 is attached to the support means 40 (FIG. 5). With the recovery bag 42 thus attached to the support means 40, the bag portion 68 is put on the support base 46. The height of the support base 46 is set to a height at which the support base does not sink under water even when a maximum quantity of water is introduced into the grease trap 10. Therefore, the bag portion 68 is not wet with water accumulated within the grease trap 10.

Figure 6:
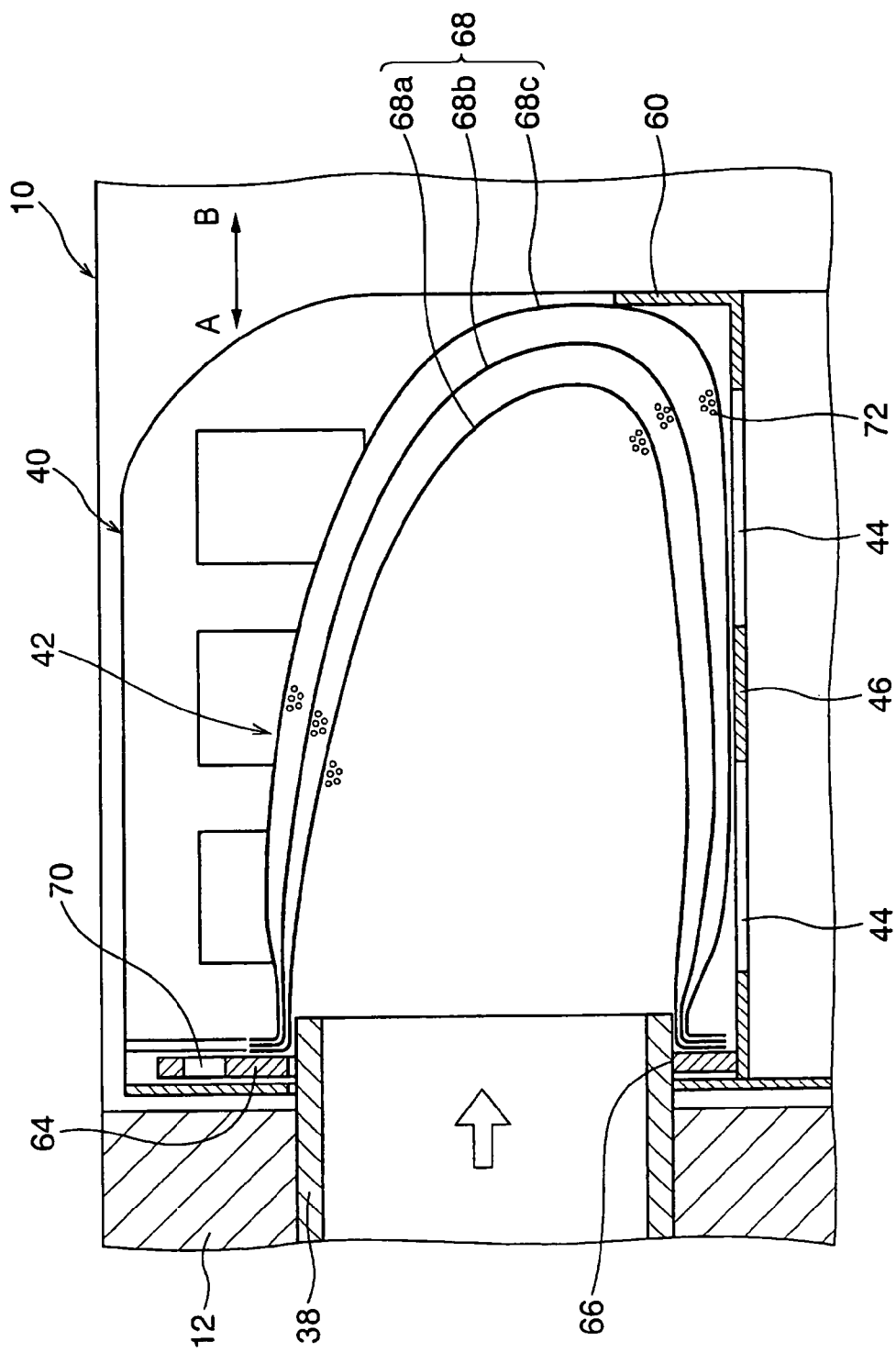
FIG. 6 is a sectional view showing a fitted state of both drain pipe and recovery bag.

After attaching the recovery bag 42 to the support means 40, the support means 40 is moved in the direction of arrow A with respect to the pedestal 62 in FIG. 5 (the support means 40 is moved in the direction of arrow A with respect to the body 12 in FIG. 6). By thus moving the support means 40, a front end of the drain pipe 38 is inserted into the drainage introducing hole 66 formed in the base portion 64 of the recovery bag 42, as shown in FIG. 6. As a result, the drainage discharged through the drain pipe 38 from a washing sink in the kitchen of a restaurant or the like can be introduced positively into the bag portion 68 (the innermost bag portion 68a).

In the drainage discharged from the kitchen washing sink of a restaurant or the like there are contained refuse having shapes (e.g., food residue, toothpicks and skewers) and oil (sludge such as oil and fat), of which the refuse having shapes is usually trapped by the innermost bag portion 68a. In the refuse having shapes, one having a sharp tip, e.g., skewers, may pierce through the innermost bag portion 68a, but can be trapped by the middle bag portion 68b or the outside bag portion 68c. On the other hand, as the material of the bag portions 68a, 68b, and 68c there is used, for example, non-woven fabric which permits water to pass therethrough but permits the adhesion of oil thereto (does not permit the passage of oil). Therefore, oil contained in the drainage adheres to the inner wall of the inside bag portion 68a. The oil adhered to the inner wall of the bag portion 68a then adheres to the refuse trapped by the bag portion 68a. Oil which has passed through the water passing holes 72 of the inside bag portion 68a and oil incapable of being trapped by the inner wall of the bag portion 68a enter the first space 74 between the bag portions 68a and 68b and are adhered to and trapped by the inner wall of the bag portion 68b. Further, oil which has passed through the water passing holes 72 of the bag portion 68b and oil incapable of being trapped by the inner wall of the bag portion 68b enter the second space 76 between the bag portions 68b and 68c and are adhered to and trapped by the inner wall of the bag portion 68c.

Thus, the oil contained in the drainage introduced into the three layers of bag portions 68a, 68b, and 68c is not only trapped by the inner walls of those bag portions but also trapped by adhering to the refuse trapped within the bag portion 68a. Oil which has not been trapped by any of the three layers of bag portions 68a, 68b, and 68c is discharged into the first tank 16. Thereafter, the oil discharged into the first tank 16 moves to the second tank 18 and is stored within the second tank 18, then is taken out from the second tank 18. However, since the recovery bag 42 according to the present invention is provided, most of oil contained in the drainage can be trapped by the recovery bag 42 and the amount of oil reaching the first and second tanks 16, 18 can be reduced to a great extent. There also accrues an advantage such that the oil adhered to the inner walls of the bag portions 68a, 68b, and 68c allow small pieces of refuse to adhere thereto and thus small pieces of refuse can be trapped within those bag portions.

In the restaurant, the recovery bag 42 is taken out from the grease trap 10 at the end of a day's work or at the beginning of the next day's work. The work for taking out the recovery bag 42 is performed in the following manner. First, the lid 32 of the first tank 16 is removed and thereafter the support means 40 is moved in the direction of arrow B from the state of FIG. 6 to disengage the drainage introducing hole 66 formed in the base portion 64 of the recovery bag 42 from the front end of the drain pipe 38. Next, by inserting a hand into the grasping hole 70 formed in the base portion 64 of the recovery bag 42 and lifting the recovery bag 42, it is possible to take out the recovery bag 42 from the support means 40. Since the position where the worker touches the recovery bag 42 is the position (the position not stained with drainage) of the grasping hole 70 in the base portion 64 which is spaced away from the bag portion 68, the worker's hand is not stained in the work of taking out the recovery bag 42. The bag portion 68 is positioned higher than the water levels 36a and 36b in the grease trap 10, so with the lapse of a certain time after flowing-out of the last drainage, the bag portion 68 assumes a water-exhausted state and there is no fear of water dropping from the bag portion 68 even when the recovery bag 42 is taken out.

Heretofore it has been required to remove refuse having shapes (e.g., food residue, toothpicks and skewers) from the residue basket 26 and wash the residue basket 26 with oil (sludge such as oil and fat) adhered thereto. In the present invention, all that is required is merely taking out the recovery bag 42 from the support means 40 and thus there is no fear of a hand being stained at the time of mounting and removal of the recovery bag 42. Besides, the recovery bag 42 is not immersed in water present within the grease trap 10, so if the recovery bag 42 is replaced every day for example, it follows that the recovery bag 42 is removed before food residue present within the recovery bag 42 emits an offensive smell. Therefore, it is not likely for any restaurant worker to feel an offensive smell. Thus, according to the present invention, any restaurant worker does not have an unpleasant feeling in connection with the works associated with the grease trap 10 and hence it is possible to greatly improve the rate of settling of both full-time and part-time workers in the same restaurant.

Since the recovery bag 42 traps oil with use of, say, three layers of bag portions 68a, 68b, and 68c, most of oil contained in the drainage discharged toward the grease trap 10 is trapped by the recovery bag 42. Therefore, the amount of oil staying in the second tank 18 of the grease trap 10 per day can be decreased to a great extent. Consequently, the interval of the oil removing work from the grease trap 10 can be prolonged much longer than the conventional like interval, so that the interval of the cleaning work for the interior of the grease trap 10 can also be prolonged and it is possible to greatly reduce the cost of the cleaning work for the grease trap 10.

Figure 7:
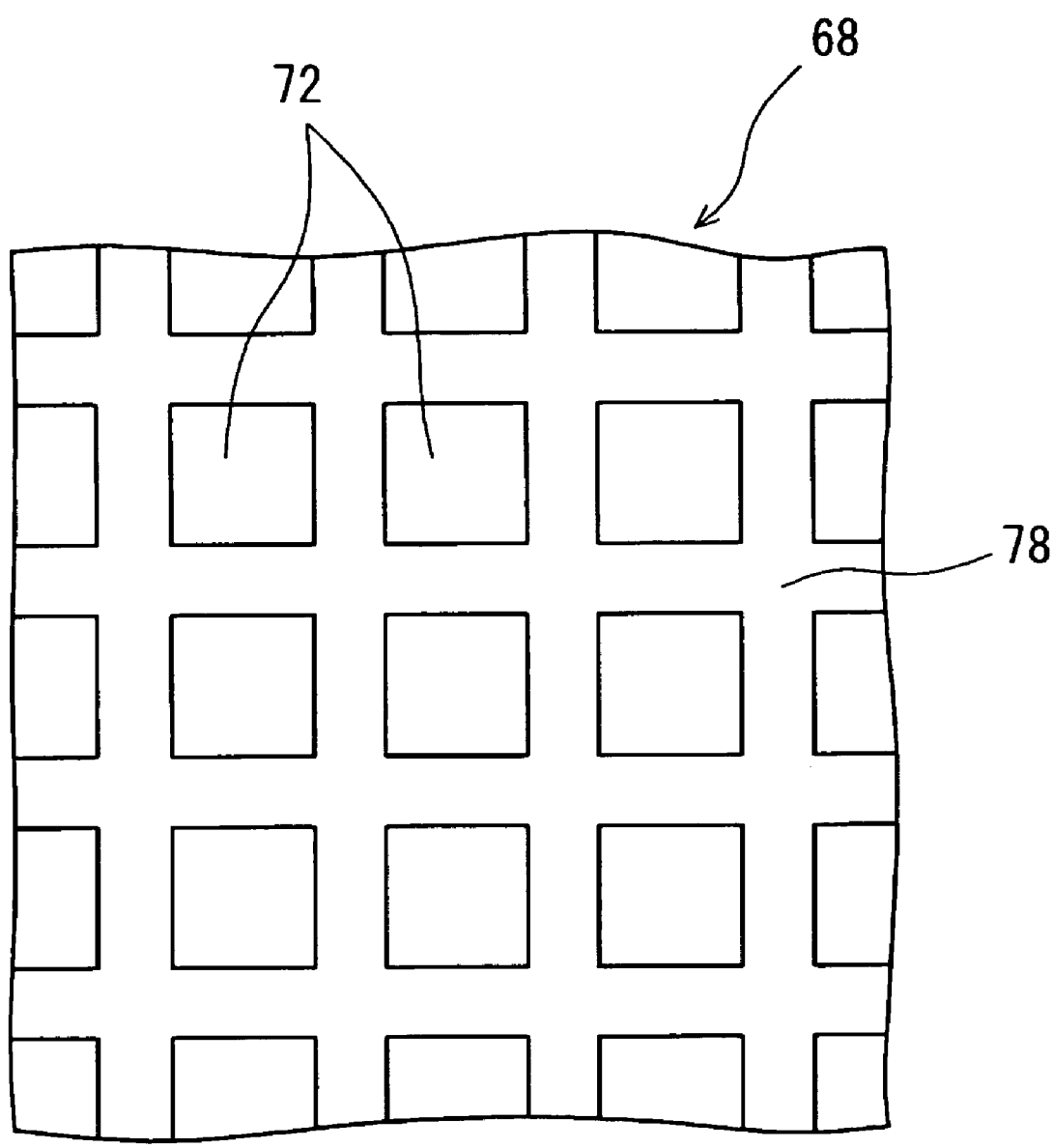
FIG. 7 is an enlarged front view of a principal portion of another recovery bag used in the present invention.

Each of the bag portions 68 may be formed by a net 78 instead of non-woven fabric (FIG. 7), the net 78 being formed of a material (e.g., synthetic resin or synthetic fiber) which permits the adhesion of oil thereto and having a large number of water passing holes 72. The synthetic resin or synthetic fiber is one which permits the passage of neither water nor oil. Therefore, in the case where the bag portion 68 is formed by three layers, water passes through the water passing holes 72 in the first layer net 78, but adhesive oil adheres to the first layer net 78. Even the oil which has failed to adhere the first layer net 78 adheres to the second and third layer nets 78. On the other hand, water passes through the water passing holes 72 in each layer net 78, further passes through the interiors of plural layers of bag portions 68 and reaches the exterior. Moreover, since refuse adheres to the oil adhered to the inner walls of the bag portions 68a, 68b, and 68c, there accrues an advantage such that oil and refuse can be trapped within the bag portions 68a, 68b, and 68c.

Thus, even if the bag portion 68 is made up of, say, three layers of nets 78, since oil adheres to the nets 78, most of oil and refuse adhered to the oil can be trapped by the three layers of nets 78. The nets 78 made of such a material as synthetic resin or synthetic fiber are stronger and less expensive than other materials formed with a large number of water passing holes 72. Also when each layer in the bag portion 68 is formed by the net 78, it is preferable that one side or the diameter of each water passing hole 72 be 1 to 5 mm (both inclusive), provided no limitation is made thereto.

Although according to the above construction the support member 40 is put on the bottom or pedestal 62 in the first tank 16, there may be adopted a construction wherein the support member is suspended from above the first tank 16 with use of a hook (not shown). Further, although the support means 40 is provided with the first engaging means for engagement with the second engaging means of the recovery bag 42, the first engaging means adapted to engage the second engaging means may be provided on the body 12 side of the grease trap 10.

Figure 8:
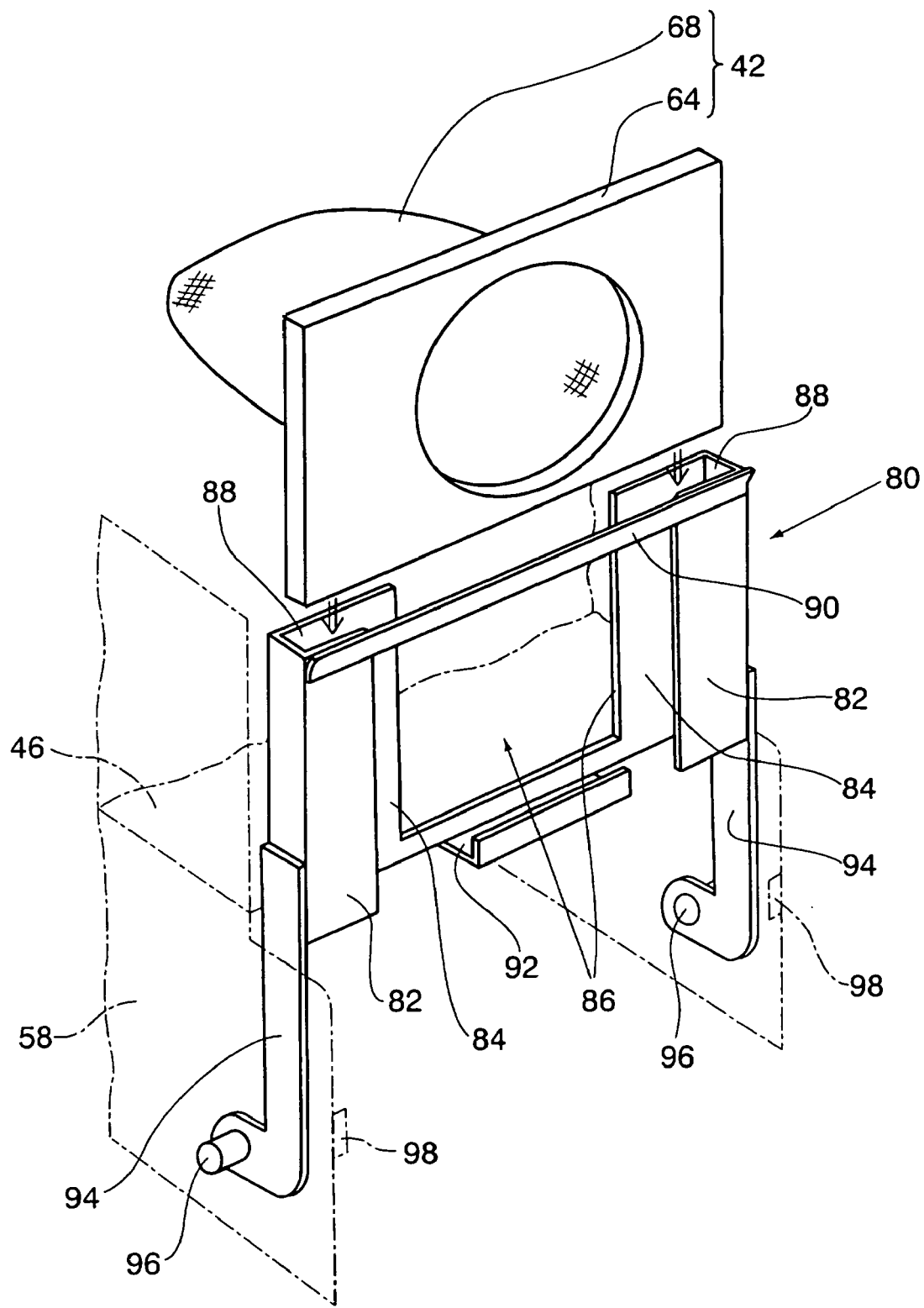
FIG. 8 is a perspective view showing another example of support means used in the present invention.

Next, support means 80 as a modification of the support means 40 shown in FIG. 2 is shown in FIG. 8. In the support means 80 of FIG. 8, the same reference numerals as in FIG. 2 represent the same members as in FIG. 2. In the support means 40 shown in FIG. 2, the front wall 48 provided with the engaging members 56 for mounting and removal of the recovery bag 42 is fixed to the support base 46 and the legs 58, while in the support means 80 shown in FIG. 8, a movable member 84 as a front wall provided with engaging members 82 for mounting and removal of the recovery bag 42 is mounted movably, or pivotably, relative to the support base 46 and the legs 58. A cutout portion 86 is formed centrally of the movable member 84. The engaging members 82 are formed in a bent state on both sides of the cutout portion 86 of the movable member 84. Fitting slots 88 which permit the base portion 64 of the recovery bag 42 to be inserted therein are formed by the engaging members 82 as first engaging means and the movable member 84. A connecting rod 90 for connecting both-side engaging members 82 with each other is fixed to upper portions of the engaging members 82. A support portion 92 for supporting a lower edge of the base portion 64 of the recovery bag 42 is provided in a lower portion of the movable member 84. Downwardly extending arms 94 are fixed to both side faces of the movable member 84 and pins 96 are fixed respectively to the arms 94 at positions near lower ends of the arms 94, the pins 96 being held pivotably by the legs 58. That is, the movable member 84 is mounted so as to be pivotable with respect to the leg 58, centered on the positions where the two pins 96 are held by the legs 58. The movable member 84 may be made movable horizontally with respect to the legs 58 with use of another moving means. The legs 58 are respectively provided with stoppers 98 for preventing the arms 94 from tilting in a direction spaced a longer distance than a predetermined distance from the support base 46.

Figure 9:
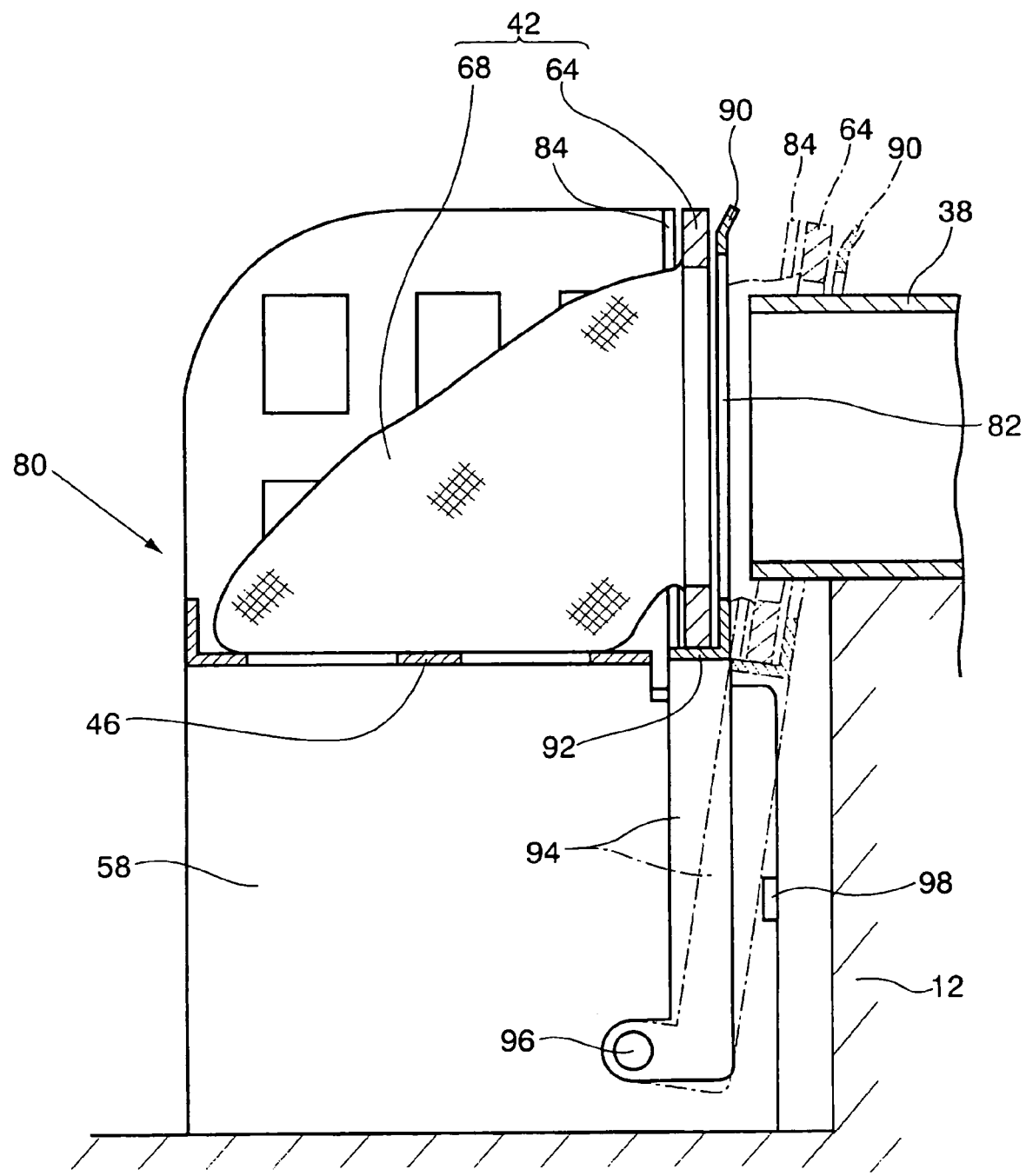
FIG. 9 is a side view showing a state of use of the support means of FIG. 8.

For mounting the recovery bag 42 to the support means 80, as shown in FIG. 8, the base portion 64 of the recovery bag 42 is inserted into the fitting slots 88 formed by the movable member 84 and the engaging members 82 in the support means 80. With the base portion 64 of the recovery bag 42 thus inserted into the fitting slots 88 of the support means 80, the bag portion 68 of the recovery bag 42 passes through the cutout portion 86 (FIG. 8) of the movable member 84 and a lower surface thereof is put on the support base 46, as shown in FIG. 9. In case of loading the bag portions 68 of the recovery bag 42 with respect to the fitting slots 88 of the support means 80, as shown in FIG. 9, the movable member 84 is moved beforehand to a movement position (a position close to the support base 46) on one side lest the drain pipe 38 should become contact with the recovery bag 42. The movable member 84, the base portion 64 of the recovery bag 42 and the arms 94 in this state are indicated by solid lines in FIG. 9. Thereafter, the worker is required to hold the connecting rod 90 with his or her hand and move the arms 94 pivotally about the pins 96, allowing the movable member 84 and the base portion 64 of the recovery bag 42 to fall down to the front end side of the drain pipe 38. The movable member 84, the base portion 64 and the arms 94 thus brought down to the drain pipe 38 side are indicated by dot-dash lines in FIG. 9. By causing the recovery bag 42 to tilt to the front end side of the drain pipe 38 together with the movable member 84, the front end of the drain pipe 38 can be positioned within the bag portion 68 (the innermost bag portion 68a) of the recovery bag 42.

Thus, in the support means 80 shown in FIGS. 8 and 9, the front end of the drain pipe 38 can be inserted into the bag portion 68 of the recovery bag 42 by tilting the movable member 84 and the arms 94. Consequently, in comparison with the work of moving the whole of the support means 40 back and forth as in FIG. 2, the work of positioning the front end of the drain pipe 38 within the bag portion 68 of the recovery bag 42 becomes easier. For dismounting the recovery bag 42 from the support means 80, the movable member 84 and the arms 94 are moved from the dot-dash line state in FIG. 9 to a position (the solid line position in FIG. 9) close to the support base 46. As a result, the front end of the drain pipe 38 becomes disengaged from the recovery bag 42. Thereafter, by pulling the recovery bag 42 upward, the recovery bag 42 can be removed from the support means 80 without being obstructed by the drain pipe 38. Thus, the movable member 84 for mounting and removal of the recovery bag 42 is mounted pivotably with respect to the legs 58, whereby it is no longer required to move the whole of the support means 80 at the time of mounting or removing the recovery bag 42 and the mounting and removing work for the recovery bag 42 becomes very easy.

The invention claimed is:

1. A refuse/oil removing device for use in a grease trap into which drainage discharged from restaurant is introduced through a drain passage, and for detachably attaching a recovery bag comprised by securing a bag portion and a base portion formed of a material having rigidity, comprising:
   support means for supporting said bag portion at a position higher than the level of water accumulated in said grease trap,
   engaging means engaging with said base portion of said recovery bag, said engaging means provided with said support means or a body of said grease trap,
   a movable member displaceable relative to said support means or said body of said grease trap, said movable member displacing said engaging means,
   whereby said recovery bag is spaced away from said drain passage at one movement end of said movable member, while at an opposite movement end of said movable member a front end of said drain passage is positioned inside said bag portions of said recovery bag.

2. A refuse/oil removing device according to claim 1, wherein a drainage introducing hole for introducing the drainage from said drain passage to the interior of said bag portion is formed in said base portion, and an outlet to said grease trap side in said drain passage is formed by a pipe, said pipe being inserted into said drainage introducing hole at an opposite movement end of said movable member.

3. A refuse/oil removing device according to claim 2, wherein said bag portion is formed as plural layers.

4. A refuse/oil removing device according to claim 1, wherein a grasping hole is formed in said base portion.

5. A refuse/oil removing device according to claim 4, wherein said bag portion is formed as plural layers.

6. A refuse/oil removing device according to claim 1, wherein said bag portion is formed by a net.

7. A refuse/oil removing device according to claim 6, wherein the material of said net is synthetic resin or synthetic fiber.

8. A refuse/oil removing device according to claim 7, wherein said bag portion is formed as plural layers.

9. A refuse/oil removing device according to claim 1, wherein the size of each of said water passing holes is 1 to 5 mm.

10. A refuse/oil removing device according to claim 9, wherein said bag portion is formed as plural layers.

11. A refuse/oil removing device according to claim 1, wherein said bag portion is formed as plural layers.

12. A refuse/oil removing device according to claim 11, wherein said plural layers are three layers.

13. A refuse/oil recovery system comprising:
a grease trap including a engaging unit disposed thereon or a device provided with said grease trap; and
a bag for the recovery of refuse and oil contained in drainage introduced to said grease trap, said refuse/oil recovery bag comprising
a base portion having rigidity so as to form a plate, and including a drainage introducing hole, said base portion being engaged with said engaging unit disposed on said grease trap or said device provided with the grease trap, and
a bag portion having a plurality of water passing holes and a plurality of layers, said bag portion fixed to said base portion such that a circumference of said hole of said base portion is covered with an opening of said bag portion, and
wherein said plurality of layers includes a first outer layer, a second outer layer and an inner layer, and a first space is disposed between said first outer layer and said inner layer and a second space is disposed between said second outer layer and said inner layer,
wherein a grasping hole is disposed in said base portion, and
wherein said refuse/oil recovery bag is configured to be replaced after use thereof.

14. A refuse/oil recovery system according to claim 13, wherein said bag portion is formed by a net.

15. A refuse/oil recovery system according to claim 14, wherein the material of said net is synthetic resin or synthetic fiber.

16. A refuse/oil recovery system according to claim 13, wherein the size of each of said water passing holes is 1 to 5 mm.

17. A refuse/oil recovery bag according to claim 13, wherein said plurality of layers consists of said first outer layer, said second outer layer and said inner layer.

18. A refuse/oil recovery bag according to claim 13, wherein said plurality of water passing holes and said plurality of layers are sized and configured to hold oil and/or trash therein.

* * * * *